United States Patent [19]

Ishibashi

[11] Patent Number: 5,084,519

[45] Date of Patent: Jan. 28, 1992

[54] STRETCHED ARTICLE HAVING PEARLY GLOSS AND PROCESS FOR PREPARING SAME

[75] Inventor: Tadao Ishibashi, Chiba, Japan

[73] Assignee: Chisso Corporation, Tokyo, Japan

[21] Appl. No.: 655,781

[22] Filed: Feb. 15, 1991

[30] Foreign Application Priority Data

Feb. 20, 1990 [JP] Japan ................... 2-37279

[51] Int. Cl.$^5$ ............... C08L 23/06; C08L 23/12; C08L 45/00; C08J 5/18; B29C 55/02
[52] U.S. Cl. .................. 525/211; 525/192; 264/210.1; 264/210.7; 264/210.6; 264/290.2; 526/348.1
[58] Field of Search ............. 525/211, 192; 264/210.1, 210.7

[56] References Cited

U.S. PATENT DOCUMENTS

| | | | |
|---|---|---|---|
| 3,278,646 | 10/1966 | Lambert | 260/897 |
| 3,663,488 | 5/1972 | Kail | 525/210 |
| 3,773,609 | 11/1973 | Haruta et al. | 156/272 |
| 4,230,767 | 10/1980 | Isaka et al. | 428/439 |
| 4,499,238 | 2/1985 | Iwata et al. | 525/98 |
| 4,615,941 | 10/1986 | Lu | 428/327 |
| 4,615,942 | 10/1986 | Lu | 428/327 |
| 4,869,938 | 9/1989 | Usami et al. | 525/240 |
| 4,927,885 | 5/1990 | Hayashida et al. | 525/211 |

FOREIGN PATENT DOCUMENTS

| | | | |
|---|---|---|---|
| 927985 | 6/1973 | Canada | 400/43 |
| 3144911 | 5/1983 | Fed. Rep. of Germany | . |
| 3821581 | 12/1989 | Fed. Rep. of Germany | . |
| 49-18472 | 2/1974 | Japan | . |
| 59-68340 | 4/1984 | Japan | . |
| 63-163949 | 8/1985 | Japan | . |
| 63035642 | 2/1988 | Japan | . |
| 63-117043 | 5/1988 | Japan | . |
| 63-168441 | 7/1988 | Japan | . |

*Primary Examiner*—Carman J. Seccuro
*Attorney, Agent, or Firm*—Leydig, Voit & Mayer

[57] ABSTRACT

The present invention provides a stretched article having a pearly gloss and a total light transmission of 40% or less which is obtained by molding a composition comprising 100 parts by weight of a crystalline polypropylene, 0.5 to 30 parts by weight of a high-density polyethylene having a density of 0.94 or more and 5 to 50 parts by weight of a cyclopentadiene petroleum resin having a softening point (according to the ring and ball metyhod) of 160° C. or more, and then stretching the resulting molded article; and a process for producing a stretched article having a pearly gloss which comprises the steps of melt-extruding the above-mentioned composition at on above the softening point of the petroleum resin, cooling the extruded composition to form an unstretched raw fabric, and then stretching the raw fabric 200% or more in at least one direction at a temperature which is lower than the crystalline melting point of the polypropylene and is equal to or below the softening point of the petroleum resin.

12 Claims, No Drawings

STRETCHED ARTICLE HAVING PEARLY GLOSS AND PROCESS FOR PREPARING SAME

BACKGROUND OF THE INVENTION (i) Field of the Invention

The present invention relates to a stretched article having a pearly gloss which mainly comprises a polypropylene resin, and a process for producing the stretched article. More specifically, the present invention relates to a stretched article having many fine voids therein and a pearly gloss which can be obtained by adding a specific polyethylene and a specific petroleum hydrocarbon resin having a high softening point to a crystalline polypropylene to form a composition, and then molding the composition, and stretching an obtained molded article and it also relates to a process for producing the same.

(ii) Description of the Related Art

In general, stretched articles having a pearly gloss are used, for example, as usual wrapping materials, decoration materials, synthetic papers, copy papers and the like, in the form of uniaxially and biaxially stretched films, and as packing materials and yarns in the form of tapes, ribbons and filaments.

Conventional and known techniques for providing the molded articles with a pearly gloss are (1) a process comprising the step of adding a glossy material such as a white pigment, an extender pigment or a pearl essence, (2) a process comprising the step of adding a foaming agent at the time of molding to form many foams in the molded articles, (3) a process comprising the step of adding a large amount of an inorganic filler to a crystalline polypropylene, followed by molding and stretching, to form voids in the molded article, as described in Japanese Patent Publication No. 63-24532 and Japanese Patent Application Laid-open No. 63-117043, and (4) a process comprising the step of dispersing a high-melting polymer such as a nylon or a saturated polyester such as polyethylene terephthalate in a crystalline polypropylene (Japanese Patent Application Laid-open No. 61-157547 and U.S. Pat. No. 4,377,616).

However, these techniques have the following drawbacks: In the above-mentioned process (1), different kinds of pigments must be distinctively used to obtain an opaque state and a pearly appearance, and the pearl essence is very expensive. In addition, a particular mixing manner and device for dispersing the pigments are required. The above-mentioned process (2) requires particular molding conditions and the proper selection of the foaming agent in compliance with a use purpose, and in case that a thin film is desired, there is the disadvantage that formation of uniform fine foams is difficult. In the process (3), it is easy to obtain the opaque state by adding a large amount of the inorganic filler, but fluidity at the time of extrusion noticeably deteriorates and a screen pack is clogged. In addition, many troubles are caused in the course of production and, for example, foaming by absorbed moisture and poor dispersion tend to occur owing to the inorganic filler, and a long time is taken to exchange a resin. Articles obtained by process (3) have a poor luster, coarse surfaces, a bad pearly gloss and insufficient impact resistance.

With regard to process (4), nylon, and saturated polyester, such as polyethylene terephthalate or polybutylene terephthalate and the like, are poor in compatibility with crystalline polypropylene. Since nylon and the like are noticeably different from the polypropylene in flow behavior (melting viscosity and the like), uniform dispersion is difficult and a raw fabric is liable to become nonuniform and easily break in a stretching treatment, which means that productivity is poor. Stretched articles are opaque, but there is the problem that the dull articles having a low gloss are only obtained.

The present inventors have conducted various research to obtain opaque stretched articles having a pearly gloss, and as a result, it has been found that the opaque lightweight articles having an excellent pearly gloss and good gas barrier properties can be easily obtained in high productivity by the use of a composition which can be prepared by adding a specific amount of a specific cyclopentadiene petroleum resin to a blend of a polypropylene and a specific polyethylene, and the present invention has been achieved on the basis of this knowledge.

SUMMARY OF THE INVENTION

An object of the present invention is to provide an opaque lightweight stretched article having an excellent pearly gloss and good gas barrier properties.

Another object of the present invention is to provide a process for producing the above stretched articles in a high productivity.

That is, the aspects of the present invention are as follows:

(1) A stretched article having a pearly gloss and a total light transmission of 40% or less which is obtained by molding a composition comprising 100 parts by weight of a crystalline polypropylene, 0.5 to 30 parts by weight of a high-density polyethylene having a density of 0.94 or more and 5 to 50 parts by weight of a cyclopentadiene petroleum resin having a softening point (according to the ring and ball method) of 160° C. or more, and then stretching the resulting molded article.

(2) A process for producing a stretched article having a pearly gloss which comprises the steps of melt-extruding a composition comprising 100 parts by weight of a crystalline polypropylene, 0.5 to 30 parts by weight of a high-density polyethylene having a density of 0.94 or more and 5 to 50 parts by weight of a cyclopentadiene petroleum resin having a softening point (according to the ring and ball method) of 160° C. or more at a temperature of the softening point or more of the petroleum resin, cooling the extruded composition to form an unstretched raw fabric, and then stretching the raw fabric 200% or more in at least one direction at a temperature which is less than the crystalline melting point of the polypropylene and is the softening point or less of the petroleum resin.

(3) A stretched article having a pearly gloss or a process for producing the same according to the preceding paragraphs (1) or (2) wherein the melt flow rate (MFR-PP) of the crystalline polypropylene is in the range of from 0.1 to 10 g/10 min. and the ratio of the melt flow rate (MFR-PE) of the high-density polyethylene to MFR-PP, i.e., MFR-PE/MFR-PP is 0.5 g/10 min. or less.

(4) A stretched article having a pearly gloss or a process for producing the same according to any one of the preceding paragraphs (1), (2) and (3) wherein the cyclopentadiene petroleum resin is a hydrogenated cyclopentadiene petroleum resin having a softening point of from 170° to 200° C. and an iodine value of 20 or less, which is obtained by hydrogenating a petroleum resin containing 50% by weight or more of a cyclopentadiene component.

DESCRIPTION OF PREFERRED EMBODIMENTS

A crystalline polypropylene used in the present invention is a homopolymer of propylene, copolymers of propylene as the main component and another α-olefin, or a mixture thereof.

The melt flow rate (MFR-PP) of this crystalline polypropylene is preferably in the range of from 0.1 to 10 g/10 min.

A high-density polyethylene used in the present invention is a polymer or a copolymer containing ethylene as the main component, having a density of 0.94 or more which can be obtained by polymerizing ethylene or copolymerizing ethylene and a small amount of an α-olefin such as propylene or butene-1 by a medium or low pressure process.

In particular, the high-density polyethylene used in the present invention preferably meets the requirement that the ratio of its melt flow rate (MFR-PE) to the melt flow rate (MFR-PP) of the crystalline polypropylene, i.e., MFR-PE/MFR-PP is 0.5 or less.

A cyclopentadiene petroleum resin used in the present invention is a cyclopentadiene petroleum resin containing 50% by weight or more of a cyclopentadiene component, having a high softening point (according to the ring and ball method) of 160° C. or more and a high-molecular weight, a hydrogenated cyclopentadiene petroleum resin having a softening point (according to the ring and ball method) of 160° C. or more which can be obtained by hydrogenating the above-mentioned cyclopentadiene petroleum resin having a high-molecular weight and a high softening point in a conventional manner, or a mixture thereof.

The above-mentioned cyclopentadiene petroleum resin having a high-molecular weight and a high-softening point can be obtained by subjecting a fraction which is obtained through steam cracking or another treatment of petroleum naphtha or the like and contains a cyclopentadiene, a dicyclopentadiene, its polymer, an alkyl-substituted compound thereof or a mixture thereof as the main component, to a thermal polymerization in the presence or absence of a solvent under the atmosphere of an inert gas such as a nitrogen gas preferably at a high temperature of 220° C. or more under such a pressure as to maintain a polymerization system in the state of a liquid phase preferably for several hours or more.

Furthermore, the above hydrogenated cyclopentadiene petroleum resin can be obtained by hydrogenating the above-mentioned cyclopentadiene petroleum resin having a high-molecular weight and a high-softening point by the use of a catalyst of a metal such as palladium, nickel or cobalt, its oxide or the like in the presence of a solvent at a temperature of from 150° to 300° C. under a hydrogen pressure of from 10 to 150 kg/cm$^2$.

The thermal polymerization of the above-mentioned cyclopentadiene fraction may be achieved by a one stage polymerization, but the employment of a two- or more-stage polymerization is also possible in which dicyclopentadiene is polymerized, for example, in two stages. The above-mentioned polymerization process and polymerization/hydrogenation process may be carried out by a continuous system or a batch system.

Of the thus obtained cyclopentadiene petroleum resins, what can be used in the present invention must have a softening point (according to the ring and ball method) of 160° C. or more. The cyclopentadiene petroleum resin having a softening point of less than 160° C. is poor in opacity and a pearly gloss, with the result that any stretched article which is intended by the present invention cannot be obtained. Furthermore, when the cyclopentadiene petroleum resin having a softening point of 150° C. or less is used, the article obtained is transparent, as in the cases of Japanese Patent Application Laid-open No. 61-203140 and a known hydrogenated petroleum resin, and therefore the extremely characteristic stretched article which is sought by the present invention, i.e., an opaque stretched article having fine voids and the pearly gloss, cannot be obtained.

In the present invention, a hydrogenated cyclopentadiene petroleum resin having a softening point of 160° C. or more is preferable, and a hydrogenated cyclopentadiene petroleum resin having a softening point of from 170° to 200° C. and an iodine value of 20 or less is particularly preferable, because such a resin is excellent in compatibility with the polypropylene or the high-density polyethylene and permits stable processing to be achieved and a stretched article having excellent whiteness and opacity and a good surface gloss to be obtained.

A composition used in the present invention can be prepared by mixing 0.5 to 30 parts by weight of a high-density polyethylene having a density of 0.94 or more and 5 to 50 parts by weight of a cyclopentadiene petroleum resin having a softening point (according to the ring and ball method) of 160° C. or more with 100 parts by weight of crystalline polypropylene. When the amount of the high-density polyethylene is less than 0.5 part by weight, a light transmission is high and opacity is lacking, and when it is more than 30 parts by weight, troubles such as curling and breaking of the stretched article tend to occur, and the film obtained has a poor surface gloss and a poor pearly gloss. Furthermore, when the amount of the petroleum resin is less than 5 parts by weight, the opacity imparting effect, which is intended by the present invention, is insufficient, and when it is more than 50 parts by weight, extrusion irregularity and breaking of the stretched article easily take place at the time of molding and stretching, so that productivity deteriorates extremely.

When this composition containing the specific amounts of high-density polyethylene and the specific cyclopentadiene petroleum resin is stretched, an extremely excellent opaque stretched article having a pearly gloss can be obtained, and the ratio of these materials can be suitably adjusted in compliance with the thickness, the percent of stretch and the like of the desired article in the range of the present invention.

Above all, the preferred compositions are compositions which can be prepared by mixing 1 to 20 parts by weight of a high-density polyethylene having a ratio of MFR-PE to MFR-PP, i.e., MFR-PE/MFR-PP, of 0.5 or less and 10 to 40 parts by weight of a hydrogenated cyclopentadiene petroleum resin having a softening point of from 170° to 200° C. with 100 parts by weight of a crystalline polypropylene having a MFR-PP of 0.1 to 10 g/10 min. and another composition which can be prepared by mixing 2 to 20 parts by weight of a high-density polyethylene having MFR-PE of from 0.02 to 2.0 g/10 min. and MFR-PE/MFR-PP of 0.3 or less and 12 to 35 parts by weight of a hydrogenated cyclopentadiene petroleum resin having a softening point (the ring and ball method) of from 170° to 200° C. and an iodine value of 20 or less with 100 parts by weight of a crystalline polypropylene having MFR-PP of from 0.3 to 6 g/10 min.

If necessary, some additives can be added to the composition used in the present invention comprising the crystalline polypropylene, the high-density polyethylene and the cyclopentadiene petroleum resin. These additives are various additives which can usually be added to a polypropylene, and typical examples of the usable additives include heat stabilizers and antioxidants such as a known phenolic or phosphorus-containing thioether, a lubricant and a slip agent such as a higher fatty acid, a metallic salt of a higher fatty acid such as calcium stearate or a fatty amide, an antistatic agent, an inorganic filler such as calcium carbonate or talc, an inorganic or organic pigment, and suitable kinds of polymer.

The composition can be easily prepared by mixing the crystalline polypropylene, the specific polyethylene, the specific cyclopentadiene petroleum resin and, if necessary, the above-mentioned additives in a usual blender or mixer, and in this case, it is particularly preferred that these materials be melted and kneaded by the use of an extruder, a Banbury mixer or the like to obtain the composition in the form of pellets. Moreover, an alternative process can be effectively employed in which a large amount of the petroleum resin is first added to the polypropylene or another resin and then master-batched, and the resulting masterbatch is mixed with the polypropylene and the high-density polyethylene to obtain the mixed composition.

The thus obtained composition is then extruded in accordance with a melt extrusion method using an extruder having various dies or nozzles to form an unstretched raw fabric, and afterward this raw fabric is subjected to a known uniaxial or biaxial stretching to obtain an opaque stretched article having a pearly gloss in the form of a film, a yarn, a filament, a hollow container or the like which is intended by the present invention. This stretching can be carried out by using a known uniaxial stretching method such as roll stretching, oven stretching or hot plate stretching, or a known simultaneous or successive biaxial stretching method such as tubular stretching or tenter stretching. In this case, stretching conditions are preferably selected so that the stretching temperature is less than the melting point of the crystalline polypropylene in the composition to be used and is lower than the softening point of the petroleum resin by 10° C. or more. Usually, the temperature for the melt extrusion is in the range of from about 180° to about 320° C., and the stretching temperature is in the range of from about 90° to about 160° C., and it can be suitably selected, considering the MFR-PP and the crystalline melting point of the crystalline polypropylene which is the basic component.

In the case of stretching in an oven, the temperature of a hot blast may be set to or above the melting point of the polypropylene, but it is impossible to achieve the stretching/orientation at a temperature of or above the melting point of the polypropylene, because the real temperature of the raw fabric to be stretched does not reach the melting point owing to interrelation among heat conductivity, the thickness and the passage speed of raw fabric. In the present invention, the stretching temperature means the real temperature which permits achieving the stretching/orientation of the crystalline polypropylene.

In obtaining the stretched article of the present invention, a percent of stretch is preferably 200% or more in one direction and 400% or more in terms of area. It is particularly preferable to employ the simultaneous or successive biaxial stretching method in which the stretching is performed at a high percent of stretch of from about 100% to about 600% in terms of area.

The unstretched article which is obtained by molding the composition used in the present invention without stretching is slightly cloudy and semitransparent and has a density larger than the polypropylene alone, and therefore the molded article which is intended by the present invention cannot be obtained without stretching. Thus, the stretched article of the present invention can easily be distinguished from the unstretched molded article by appearance and density.

The stretched article which can be obtained by the present invention is characterized by having many fine voids therein and a total light transmission of 40% or less. When the total light transmission is more than 40%, an opaque state is poor, with the result that the stretched article having a unique pearly appearance cannot be obtained. The stretched article having a total light transmission of 30% or less and an apparent density of 0.75 or less is particularly preferable, because it is excellent in the opaque state, i.e., light shielding properties and pearly gloss.

The stretched article obtained by the present invention, if necessary, can be subjected to a surface treatment such as a corona treatment or a plasma treatment under an atmosphere of air, oxygen, nitrogen or the like.

As understood from the foregoing, the process of the present invention permits producing an opaque stretched article having a pearly gloss in a much higher productivity than a known method, and the stretched article obtained has a high opacity, a lower weight and a high gloss. Therefore, the stretched article can be widely used in applications such as usual wrapping materials, decoration materials, packing materials and yarns by the utilization of its unique pearly gloss.

Now, the present invention will be described in more detail with reference to examples and comparative examples, but the scope of the present invention should not be limited by these examples.

Characteristic values in the undermentioned examples and comparative examples were measured as follows:

(1) Softening point (the ring and ball method): Measurement was made in accordance with JIS K2207-1980. The unit of the softening point was °C.

(2) Iodine value: Measurement was made in accordance with JIS K0070-1966. The iodine value means the number of grams of iodine absorbed by unsaturated components in 100 g of a sample.

(3) Apparent density: This was a value obtained by measuring the weight of 1 $m^2$ of a stretched sample, converting it to the weight of 1 $cm^2$, and then dividing it by the thickness (cm) of the sample. The unit of the apparent density was $g/cm^3$.

(4) Total light transmission: Measurement was made in accordance with JIS K-6714.

(5) Haze: Measurement was made in accordance with ASTM D1003.

(6) MFR (melt flow rate): MFRs of a crystalline polypropylene and a propylene copolymer were measured under Test Conditions 14 (230° C., 2.16 kgf) and MFRs of high-density polyethylene were measured under Test Conditions 4 (190° C., 2.16 kgf), respectively, in accordance with JIS K7210-1976, and MFR of the crystalline polypropylene and that of the copolymer were simply represented by MFR-PP and MFR of the high-density polyethylene were simply represented by MFR-PE. The unit of MFR was g/10 min.

(7) Crystalline melting point (Tm): About 10 mg of a sample was set on a differential scanning calorimeter (DSC), its temperature was raised starting from room temperature at a temperature elevation rate of 20° C./min. and an endothermic curve accompanying the fusion of the crystal was measured, the peak temperature on the curve being denoted as Tm (unit: °C.). At that time, if a plurality of fusion peaks were observed, the temperature of the peak having a maximum peak area was denoted as Tm.

(8) Density: The density of the polyethylene was measured in accordance with Item 4.2 of JIS K6760-1981 Polyethylene Test Procedure. The unit of the density was g/cm$^3$.

(9) Glossiness: Measurement was made in accordance with ASTM D523 (measurement angle 20°). The unit of the glossiness was %.

EXAMPLES 1 TO 6 AND COMPARATIVE EXAMPLES 1 TO 4

0.1 part of a phenolic antioxidant (trade name BHT), 0.1 part by weight of calcium stearate, a polyethylene resin and a cyclopentadiene petroleum resin shown in Table 1 were added to 100 parts by weight of a crystalline polypropylene powder having MFR-PP of 2.5 g/10 min. and containing 95% by weight of an n-heptane-insoluble portion, and they were then mixed in a Henschel mixer. Afterward, the mixture was melted and kneaded through an extruder at 240° C., cooled, and then cut in order to obtain a composition in the form of pellets. The thus obtained composition pellets were melt-extruded through an extruder having a diameter of 40 mm and a T die of a width of 30 cm at a temperature of 240° C. and then quenched through a pair of mirror surface cooling rolls maintained at 50° C. to obtain an unstretched raw fabric sheet having a thickness of 1.2 mm.

Next, this raw fabric sheet was cut into a square form, and then preheated at a temperature of from 153° to 157° C. for 70 seconds by the use of a pantagraph type biaxial stretching machine. Afterward, the preheated sheet was stretched 450% at the same temperature in the longitudinal direction, and then immediately stretched 800% at the same temperature in a transverse direction (in a direction crossing at right angles with the stretch in the first stage). Furthermore, the stretched sheet was subjected to heat treatment for 15 seconds while relieving by 3% to form a successive biaxially stretched film. Characteristic values of the stretched films are set forth in Table 1. The above-mentioned cyclopentadiene petroleum resin was obtained by polymerizing a fraction containing 75% or more of cyclopentadiene or dicyclopentadiene in a usual known manner, while polymerization conditions (temperature, pressure, time and the like) were adjusted, and in this connection, the aforesaid cyclopentadiene or dicyclopentadiene was prepared from steam-cracking naphtha. In addition, hydrogenation was carried out at 250° C. under a hydrogen pressure of 80 kg/cm$^2$ by the use of a nickel catalyst which had been prepared so as to obtain a predetermined iodine value under the above-mentioned conditions.

In Comparative Example 1, neither the polyethylene resin nor the cyclopentadiene resin was added; in Comparative Example 2, the polyethylene resin was only added; in Comparative Example 3, the softening point of the cyclopentadiene resin was less than 160° C.; and in Comparative Example 4, the cyclopentadiene resin was only added (the polyethylene resin was not added).

As is apparent from Table 1, the films of the examples regarding the present invention have low total light transmissions, low densities, uniform fine voids and a pearly gloss and are opaque, in contrast to the films of the comparative examples.

TABLE (I)

| | Polyethylene Resin | | |
|---|---|---|---|
| | Density g/cm$^3$ | MFR-PE g/10 min. | Amount (parts by weight) |
| Comp. Ex. 1 | — | — | not added |
| Comp. Ex. 2 | 0.950 | 0.25 | 10 |
| Example 1 | 0.950 | 0.25 | 10 |
| Example 2 | 0.950 | 0.25 | 10 |
| Example 3 | 0.955 | 0.16 | 5 |
| Example 4 | 0.955 | 0.16 | 5 |
| Example 5 | 0.952 | 0.30 | 10 |
| Example 6 | 0.953 | 0.05 | 3 |
| Comp. Ex. 3 | 0.953 | 0.05 | 3 |
| Comp. Ex. 4 | | | not added |

TABLE 1 (II)

| | Cyclopentadiene Petroleum Resin | | |
|---|---|---|---|
| | Softening Point °C. | Iodine Value | Amount (parts by weight) |
| Comp. Ex. 1 | — | — | not added |
| Comp. Ex. 2 | — | — | not added |
| Example 1 | 175 | 12 | 10 |
| Example 2 | 175 | 12 | 20 |
| Example 3 | 188 | 16 | 15 |
| Example 4 | 188 | 16 | 30 |
| Example 5 | 188 | 16 | 20 |
| Example 6 | 172 | 10 | 20 |
| Comp. Ex. 3 | 150 | 10 | 20 |
| Comp. Ex. 4 | 172 | 10 | 20 |

TABLE 1 (III)

| | Characteristics of Film | | | |
|---|---|---|---|---|
| | Density g/cm$^3$ | Haze % | Total Light Transmission (%) | Glossiness (%) |
| Comp. Ex. 1 | 0.91 | 1.2 | 97 | 136 |
| Comp. Ex. 2 | 0.92 | 11.3 | 88 | 73 |
| Example 1 | 0.75 | 93.6 | 28 | 66 |
| Example 2 | 0.63 | 97.1 | 18 | 63 |
| Example 3 | 0.76 | 92.9 | 26 | 67 |
| Example 4 | 0.62 | 97.2 | 17 | 64 |
| Example 5 | 0.67 | 95.6 | 22 | 81 |
| Example 6 | 0.71 | 94.4 | 28 | 58 |
| Comp. Ex. 3 | 0.92 | 6.9 | 91 | 93 |
| Comp. Ex. 4 | 0.80 | 33.4 | 38 | 90 |

EXAMPLE 7

The crystalline polypropylene powder used in Example 2 was replaced with a crystalline ethylene/propylene random copolymer containing 4.5% by weight of an ethylene component and having MFR-PP of 4.3 g/10 min. and a crystalline melting point of 141° C., and the same amounts of the same additives as in Example 2 were added to the random copolymer in order to obtain a composition in the form of pellets. The thus obtained composition pellets were melt-extruded through an extruder having a diameter of 65 mm and a T die having a width of 30 cm at a temperature of 230° C., and then quenched through a pair of mirror surface cooling rolls maintained at 20° C. to obtain an unstretched raw fabric sheet having a thickness of about 0.5 mm. This raw fabric sheet was stretched 550% in the longitudinal direction on a pair of mirror surface cooling rolls maintained at 95° C., and then subjected to heat treatment on a pair of rolls at 100° C. while relieving by 5% to form a uniaxially stretched sheet having a thickness of about 0.1 mm. This sheet had a total light transmission of 6%, an apparent density of 0.68 and a glossiness of 74%, and thus it was opaque. Furthermore, the sheet had fine voids therein and a pearly gloss.

COMPARATIVE EXAMPLE 5

The composition used in Example 7 was melt-extruded through an extruder having a diameter of 65 mm and a T die of a width of 300 mm at a temperature of 230° C., and then quenched through a pair of cooling rolls maintained at 20° C. to obtain an unstretched sheet having a thickness of 1 mm. This sheet had a total light transmission of 86% and an apparent density of 0.92, and hence it was slightly milky but transparent. Furthermore, the sheet had a high specific gravity, and it had neither voids therein nor a pearly gloss at all.

COMPARATIVE EXAMPLE 6

The same procedure as in Example 1 was effected except that 0.1 part by weight of a phenolic antioxidant (trade name BHT), 0.1 part by weight of calcium stearate and 20 parts by weight of a calcium bicarbonate powder 15 having an average particle size of 1.1 μm were added to 100 parts by weight of a crystalline polypropylene powder having MFR-PP of 2.5 g/10 min. and containing 95% by weight of an n-heptane-insoluble portion, in order to form pellets of a composition.

This composition was molded in the same manner as in Example 1 to obtain a raw fabric sheet having the same thickness, and this sheet was then stretched by the use of a pantagraph type biaxial stretching machine to form a successive biaxially stretched film.

However, in the molding step for the preparation of the raw fabric, any uniform raw fabric was not obtained under the same conditions as in Example 1, and therefore an extrusion temperature and a cooling rolls temperature were adjusted to 260° C. and 70° C., respectively. In addition, a stretching temperature was 2° C. higher than in Example 1, but at the time of the second stretching stage, the film was easily broken In fact, 6 of the 10 films were broken The resulting film exhibited a nonuniform state due to ununiformity of stretching. With regard to the characteristic values of the film, its density was 0.78 and its total light transmission was 28%, and the film was opaque and porous. However, the surface of the film was coarse, and the glossiness of the film was very low, 23%.

What is claimed is:

1. A stretched article having a pearly gloss and a total light transmission of 40% or less, which is obtained by molding a composition comprising 100 parts by weight of a crystalline polypropylene, 0.5 to 30 parts by weight of a high-density polyethylene having a density of 0.94 or more and 5 to 50 parts by weight of a cyclopentadiene petroleum resin having a softening point (according to the ring and ball method) of 160° C. or more, and then stretching the resulting molded article.

2. A stretched article having a pearly gloss according to claim 1 wherein the melt flow rate (MFR-PP) of the crystalline polypropylene is in the range of from 0.1 to 10 g/10 min. and the ratio of the melt flow rate (MFR-PE) of the high-density polyethylene to MFR-PP, i.e., MFR-PE/MFR-PP is 0.5 or less.

3. A stretched article having a pearly gloss according to claim 1 wherein the cyclopentadiene petroleum resin is a hydrogenated cyclopentadiene petroleum resin having a softening point of from 170° to 200° C. and an iodine value of 20 or less which is obtained by hydrogenating a petroleum resin containing 50% by weight or more of a cyclopentadiene component.

4. A stretched article having a pearly gloss according to claim 2 wherein the cyclopentadiene petroleum resin is a hydrogenated cyclopentadiene petroleum resin having a softening point of from 170° to 200° C. and an iodine value of 20 or less which is obtained by hydrogenating a petroleum resin containing 50% by weight or more of a cyclopentadiene component.

5. A process for producing a stretched article having a pearly gloss which comprises the steps of melt-extruding a composition comprising 100 parts by weight of a crystalline polypropylene, 0.5 to 30 parts by weight of a high-density polyethylene having a density of 0.94 or more and 5 to 50 parts by weight of a cyclopentadiene petroleum resin having a softening point (according to the ring and ball method) of 160° C. or higher at a temperature of or higher than the softening point of the petroleum resin, cooling the extruded composition to form an unstretched raw fabric, and then stretching the raw fabric by 200% or more in at least one direction at a temperature which is below the crystalline melting point of the polypropylene and is at or below the softening point of the cyclopentadiene petroleum resin.

6. A process for producing a stretched article having a pearly gloss according to claim 5 wherein the melt flow rate (MFR-PP) of the crystalline polypropylene is in the range of from 0.1 to 10 g/10 min. and the ratio of the melt flow rate (MFR-PE) of the high-density polyethylene to MFR-PP, i.e., MFR-PE/MFR-PP is 0.5 or less.

7. A process for producing a stretched article having a pearly gloss according to claim 5 wherein the cyclopentadiene petroleum resin is a hydrogenated cyclopentadiene petroleum resin having a softening point of from 170° to 200° C. and an iodine value of 20 or less which is obtained by hydrogenating a petroleum resin containing 50% by weight or more of a cyclopentadiene component.

8. A process for producing a stretched article having a pearly gloss according to claim 6 wherein the cyclopentadiene petroleum resin is a hydrogenated cyclopentadiene petroleum resin having a softening point of from 170° to 200° C. and an iodine value of 20 or less which is obtained by hydrogenating a petroleum resin containing 50% by weight or more of a cyclopentadiene component.

9. A resin composition for forming opaque stretched articles having a pearly gloss comprising 100 parts by weight of a crystalline polypropylene, 0.5 to 30 parts by weight of a high-density polyethylene having a density of 0.94 or more and 5 to 50 parts by weight of a cyclopentadiene petroleum resin having a softening point (according to the ring and ball method) of 160° C. or more.

10. A resin composition for forming opaque stretched articles having a pearly gloss according to claim 9 wherein the melt flow rate (MFR-PP) of the crystalline polypropylene is in the range of from 0.1 to 10 g/10 min. and the ratio of the melt flow rate (MFR-PE) of the high-density polyethylene to MFR-PP, i.e., MFR-PE/MFR-PP is 0.5 or less.

11. A resin composition for forming opaque stretched articles having a pearly gloss according to claim 9 wherein the cyclopentadiene petroleum resin is a hydrogenated cyclopentadiene petroleum resin having a softening point of from 170° to 200° C. and an iodine value of 20 or less.

12. A resin composition for forming opaque stretched articles having a pearly gloss according to claim 10 wherein the cyclopentadiene petroleum resin is a hydrogenated cyclopentadiene petroleum resin having a softening point of from 170° to 200° C. and an iodine value of 20 or less.

* * * * *